US012333966B2

(12) United States Patent
Buzzini et al.

(10) Patent No.: US 12,333,966 B2
(45) Date of Patent: Jun. 17, 2025

(54) MERCHANDISE WITH FLEXIBLE DISPLAY AND DETACHABLE COMPONENT

(71) Applicant: Sony Interactive Entertainment LLC, San Mateo, CA (US)

(72) Inventors: Blake Buzzini, San Mateo, CA (US); Glenn Black, San Mateo, CA (US); Arthur Kwun, San Mateo, CA (US); Todd Tokubo, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 341 days.

(21) Appl. No.: 17/364,894

(22) Filed: Jul. 1, 2021

(65) Prior Publication Data

US 2023/0000180 A1 Jan. 5, 2023

(51) Int. Cl.

*G09F 9/30* (2006.01)
*A41D 1/00* (2018.01)
*G09F 21/02* (2006.01)

(52) U.S. Cl.

CPC ............ *G09F 21/023* (2020.05); *G09F 9/301* (2013.01)

(58) Field of Classification Search

CPC ...... G09F 21/00; G09F 21/023; G09F 21/026; G09F 9/30; G09F 9/301; H02J 7/00; H02J 7/02; H02J 7/34; H02J 50/20; H02J 50/80; A61B 5/00; A61B 5/11; A61B 5/256; A61B 5/273; A61B 5/277; A61B 5/332; A61B 5/0205; A61B 5/0402; A61B 5/107; A61B 5/103; A61B 5/0408; A61B 5/07; A61B 13/12; A61B 19/00; A61B 27/08; A61B 27/20; A61B 31/04; A61B 31/10; A41D 1/00–22; G06F 3/01; G06F 3/14; G06F 3/16; A41H 1/02; H05K 1/02; H05K 1/03; H05K 1/09; H05K 7/02; A41B 1/00; H05B 37/02; F21V 21/00; F21V 33/00; G09G 3/00; G09G 3/20; G09G 3/32; G09G 3/36;

(Continued)

(56) References Cited

U.S. PATENT DOCUMENTS

2008/0171914 A1 * 7/2008 Ouwerkerk ........... A61M 21/00 600/27
2010/0229279 A1 * 9/2010 Martinez ................ A41D 27/08 2/244

(Continued)

FOREIGN PATENT DOCUMENTS

JP 2010519566 A 6/2010

OTHER PUBLICATIONS

JP2023-580756, "Office Action", Jan. 21, 2025, 9 pages.

*Primary Examiner* — Chanh D Nguyen
*Assistant Examiner* — Nguyen H Truong
(74) *Attorney, Agent, or Firm* — Kilpatrick Townsend & Stockton LLP

(57) ABSTRACT

A garment system is provided, including: a main component configured to be worn by a user, the main component having a flexible display portion and a sensor; a detachable component configured to be detachably coupled to the main component; wherein the sensor detects when the detachable component is attached to, or detached from, the main component, and responsively triggers a change in imagery presented on the flexible display portion in response to said attachment or detachment of the detachable component.

15 Claims, 10 Drawing Sheets

(58) Field of Classification Search
CPC . G08B 7/00; G08B 21/02; A61N 1/04; A61N 1/39; A63B 24/00; A63B 71/06
See application file for complete search history.

(56) References Cited

U.S. PATENT DOCUMENTS

| | | | | |
|---|---|---|---|---|
| 2012/0062571 | A1* | 3/2012 | Malek | G06F 1/163 345/501 |
| 2013/0035157 | A1* | 2/2013 | Weber | G06Q 30/02 463/29 |
| 2013/0331072 | A1* | 12/2013 | Forsyth | H04L 51/04 455/414.3 |
| 2015/0143601 | A1* | 5/2015 | Longinotti-Buitoni | A41D 13/1281 2/69 |
| 2016/0050176 | A1* | 2/2016 | Norton | H04L 67/306 709/206 |
| 2016/0357384 | A1* | 12/2016 | Khalid | G06F 1/163 |
| 2017/0010794 | A1* | 1/2017 | Cho | G06F 3/04817 |
| 2017/0352058 | A1* | 12/2017 | Bender | G06Q 50/01 |
| 2018/0000169 | A1* | 1/2018 | Lee | G09F 9/30 |
| 2020/0228855 | A1* | 7/2020 | Ortiz | A63F 13/65 |
| 2021/0200288 | A1* | 7/2021 | Lee | G06F 1/26 |
| 2022/0061412 | A1* | 3/2022 | Culver, II | A41D 13/02 |
| 2022/0110381 | A1* | 4/2022 | Jefferis | A42B 3/286 |

* cited by examiner

MERCHANDISE WITH FLEXIBLE DISPLAY AND DETACHABLE COMPONENT

FIELD OF THE DISCLOSURE

Implementations of the present disclosure relate to clothing and merchandise having a display capability, and triggering changes in display based on attachment/detachment of separate components.

BACKGROUND

Description of the Related Art

A common means of self-expression is through one's clothing. For example, in a gaming context, gamers may express their affinity for, or association with, a particular video game by purchasing and wearing articles of clothing that display imagery related to the video game. However, unlike video game platforms for which gamers may purchase many different games for a single platform, articles of clothing are static and only capable of representing a single fixed image (or set of images) per article of clothing. This means that for a gamer wishing to self-express through their clothing an affinity for multiple video games, the gamer would have to purchase different articles of clothing for each game. This problem is further compounded by the continual development and release of new video games over time, thereby requiring the purchase of more and more articles of clothing if the gamer wishes to express their affinity or support for additional games.

It is in this context that implementations of the disclosure arise.

SUMMARY OF THE DISCLOSURE

Implementations of the disclosure are drawn to clothing and merchandise having a display capability, and triggering changes in display based on attachment/detachment of separate components.

In some implementations, a garment system is provided, including: a main component configured to be worn by a user, the main component having a flexible display portion and a sensor; a detachable component configured to be detachably coupled to the main component; wherein the sensor detects when the detachable component is attached to, or detached from, the main component, and responsively triggers a change in imagery presented on the flexible display portion in response to said attachment or detachment of the detachable component.

In some implementations, the detachable component or the main component includes one or more magnets that enable the detachable component to be detachably coupled to the main component.

In some implementations, the sensor is a Hall effect sensor.

In some implementations, the main component is a jacket.

In some implementations, the detachable component is a hood, a collar, pocket, zipper pull, or a cuff.

In some implementations, the flexible display portion includes an LED, OLED, or e-ink display.

In some implementations, the flexible display portion includes a color-changing textile.

In some implementations, the garment system further includes a controller for controlling the imagery presented on the flexible display portion.

In some implementations, the garment system further includes a wireless transceiver integrated with the main component, the wireless transceiver configured to enable wireless communications between the main component and a user device.

In some implementations, a garment is provided, including: a clothing component configured to be worn by a user; a flexible display integrated with the clothing component; a controller, integrated with the clothing component, that controls imagery presented on the flexible display; a wireless transceiver, integrated with the clothing component, that wirelessly receives updates from one or more transmitters in a venue, wherein said updates cause the controller to update the imagery presented on the flexible display.

In some implementations, the clothing component is a jacket.

In some implementations, the flexible display includes an LED, OLED, or e-ink display.

In some implementations, the flexible display includes a color-changing textile.

In some implementations, the updates are verified upon receipt as being from a trusted source, prior to being applied to update the imagery presented on the flexible display.

In some implementations, the venue is a location configured to host an e-sports event.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

Broadly speaking, implementations of the present disclosure are drawn to garments or articles of clothing having a configurable display that is capable of showing various kinds of imagery. In some implementations, the imagery presented on the display of the garment can be controlled or set through an app on a mobile device such as a cellular phone. Such imagery can be purchased from a marketplace or otherwise obtained or downloaded from a cloud digital asset system. In some implementations, images can be earned through gameplay of a video game, such as by attaining access to certain images by virtue of successful achievement of certain levels in a given video game, or by earning digital rewards/points through gameplay which can be redeemed for video game related images.

In some implementations, a detachable component is provided for use with a main garment, wherein the attachment or detachment of the detachable component from the main garment can be configured to trigger a change in the imagery that is presented on the display of the garment. By way of example, a detachable hood can be configured to trigger a change in imagery presented on a display on a jacket when the hood is attached or detached from the jacket.

Figure 1:
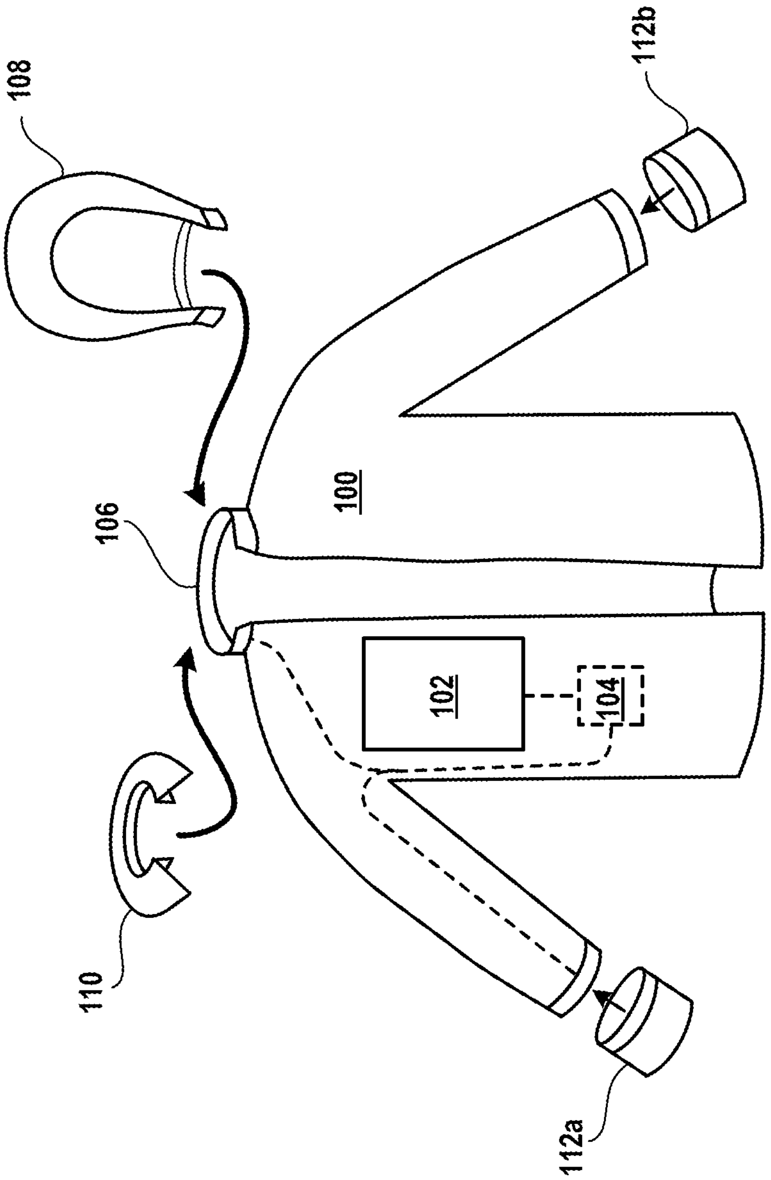
FIG. 1 conceptually illustrates a garment and associated detachable components, in accordance with implementation of the disclosure.

FIG. 1 conceptually illustrates a garment and associated detachable components, in accordance with implementation of the disclosure. In the illustrated implementation, a jacket 100 is shown, having a display 102 integrated therein. The display 102 is flexible and configurable to show various types of imagery as set by the user or in accordance with other techniques as described in further detail below. In some implementations, the display 102 is defined by an e-ink display, LED/OLED display, a color changing textile, or other flexible display technology capable of being integrated into a garment, or combinations of such technologies thereof. In some implementations, an e-ink display is layered over a color changing textile, such that the e-ink display can be utilized to draw images while the color changing textile is controlled to define the background color(s) for the drawn images.

An electronics module 104 is also integrated into the jacket 100. The electronics module 104 includes various componentry such as a battery, processor, memory and communications hardware to enable the control of imagery rendered on the display 102, and enable communication with external devices. For example, a user may obtain or purchase a design to be rendered to their jacket 100 through an app on their cell phone, and the electronics module 104 communicates wirelessly with the user's cell phone in order to receive the design and then apply the design to the display 102 for rendering. In some implementations, the electronics module 104 is removable from the jacket 100, for example, via a detachable connector system so that the electronics module 104 can be removed from the jacket for charging the battery or when the user wishes to launder the jacket 100.

In some implementations, various detachable components are provided which can be attached and detached from the jacket 100. For example, a hood 108 or a collar 110 are provided as examples of detachable components which can be attached to the collar 106 of the jacket 100. In some implementations, the attachment mechanism entails an array of magnets so that the detachable component is easily attached and detached. In other implementations, the attachment mechanism can utilize any of various other types of attachment mechanisms such as buttons, zipper, Velcro, clips, snap on buttons, or any other type of mechanism capable of attaching a component to a main article of clothing as in the presently described embodiments.

Another example in the illustrated implementation of a detachable component are the cuffs 112*a* and 112*b*, which are attachable to the ends of the sleeves of the jacket 100. It will be appreciated that the attachment mechanisms for the cuffs 112*a* and 112*b* can be the same as those utilized for the hood 108 or the collar 110.

In some implementations, the jacket can be configured to detect when a given detachable component is attached or detached. Furthermore, detection of such attachment or detachment events can be utilized to trigger rendering of predefined imagery on the display 102 of the jacket 100. For example, the display 102 can be configured to render a first image when the hood 108 is attached to the jacket 100, and then when the hood 108 is removed from the jacket, then this may trigger rendering of a second pre-defined image on the display 102. It will be appreciated that similar effects can be provided in response to attachment or detachment of the collar 110 or the cuffs 112*a* and 112*b*. As described in further detail below, sensors such as Hall effect sensors can be utilized to detect attachment or detachment of a given component when magnetic mechanisms are utilized for attachment of the component. The electronics module 104 can be configured to receive input from such sensors, and based on the input as it indicates the attachment status of a component to the jacket 100, so the electronics module 104 can responsively trigger the rendering on the display 102 based on whether the component is being attached or detached from the jacket.

In further implementations, detachable components may themselves include displays such as that described with reference to the jacket 100. That is, components can be configured to include integrated flexible displays capable of rendering images or colors or patterns, which can be set by the user or triggered in response to certain input or events. By way of example, in some implementations the attachment or detachment of a given component may trigger changes in rendering on that component. For example, when the hood 108 is attached to the jacket 100 this may trigger a change in the imagery or color of the hood 108, and likewise detachment of the hood 108 from the jacket 100 may also trigger such a change.

In some implementations, the electronics model 104 can include a GPS unit, enabling tracking of the location of the jacket, which can be used to trigger presentation of, or changes to, images or designs on the jacket. In some implementations, a given design is associated with a given location, so that when the jacket is determined, according to the GPS unit, to be at the given location, then the given design is rendered on the jacket.

While implementations of the present disclosure have been described with reference to a jacket and associated detachable components, it will be appreciated that in various implementations the principles of the present disclosure can be applied to any type of garment or clothing and corresponding detachable components. By way of example without limitation, other types of detachable components can include pockets, zipper pulls, hems, patches, etc.

Figure 2:
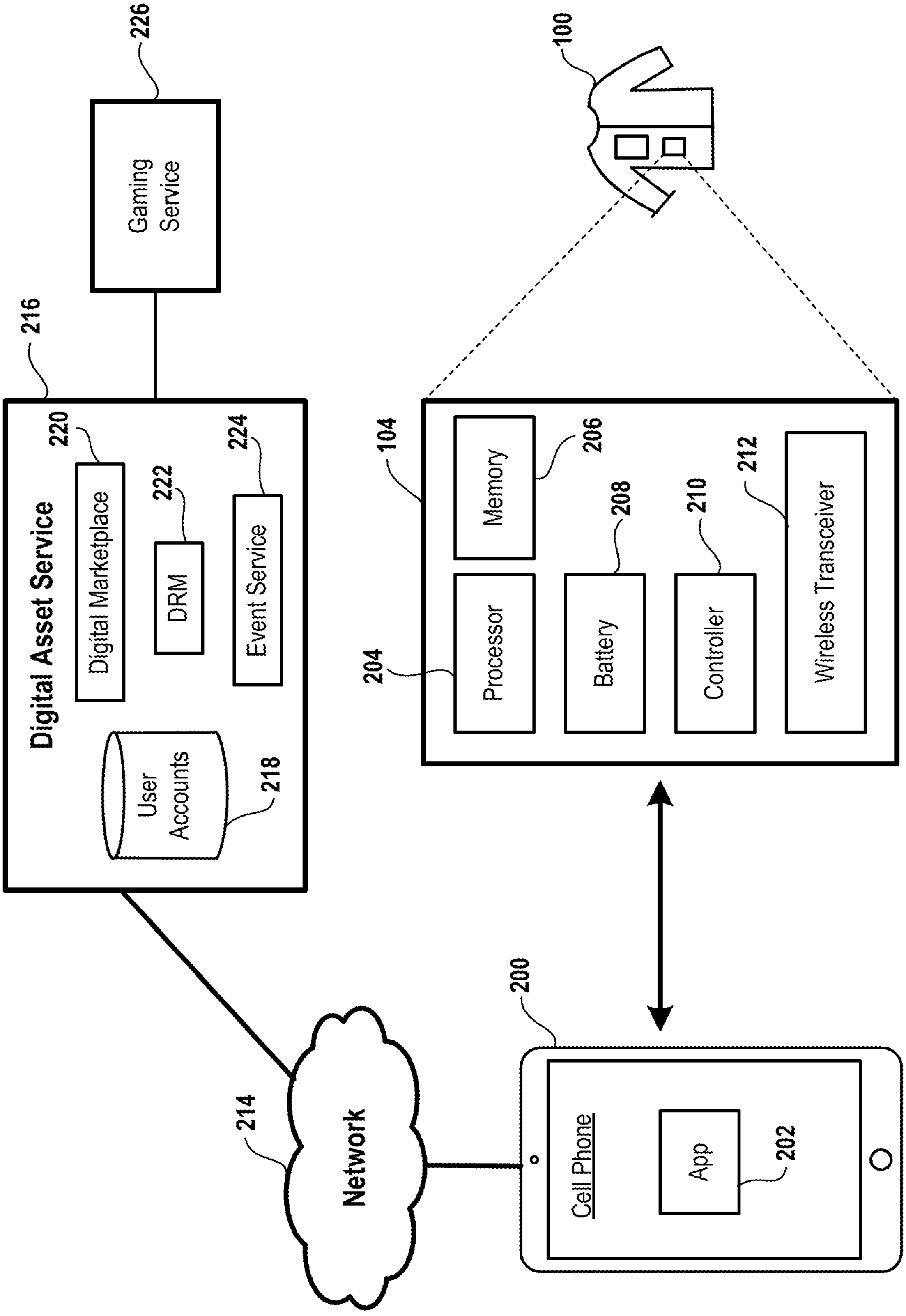
FIG. 2 conceptually illustrates a system for enabling digital assets to be presented on an article of clothing, in accordance with implementations of the disclosure.

FIG. 2 conceptually illustrates a system for enabling digital assets to be presented on an article of clothing, in accordance with implementations of the disclosure. In the illustrated implementation, the jacket 100 is shown with a conceptually expanded view of the electronics module 104 that has been previously described. The electronics module 104 includes various hardware to enable control and rendering on the display 102 of the jacket 100. For example, the electronics model 104 can include a processor 204, a memory 206, a battery 208, a controller 210, and a wireless transceiver 212. The processor and memory are configured to enable storage and execution of program instructions to provide functionality in accordance with embodiments described herein. The battery 208 provides power for the electronics module 104 as well as the display 102 of the track at 100. The controller 210 is configured to control and effect rendering on the display 102. The wireless transceiver 212 enables wireless communications between the electronics module 104 and other devices such as a cell phone 200. In some implementations, wireless communications are enabled using a wireless protocol such as Bluetooth.

In some implementations, control of the imagery to be displayed on the jacket 100 is controlled through an app 202 installed on the cell phone 200. In some implementations, the app 202 enables predefined images to be selected and rendered to the jacket 100. In some implementations, the app 202 can further provide an interface enabling a user to customize rendering on the jacket 100. For example the app 202 may provide in interface for drawing or otherwise creating designs for rendering on the jacket, or enable adjustments to settings such as background colors or patterns, etc. For example, in the case of an e-ink film formed over a color changing textile, an interface can be provided to enable drawing of a grayscale image to be rendered by the e-ink film, and setting of one or more colors and or patterns to be rendered by the color changing textile.

In some implementations, the app 202 accesses a digital asset service 216 over a network 214. The network 214 can include any of various kinds of communications/data networks including the Internet. It will be appreciated that the jacket 100 can be configured to present imagery that is obtained via the digital asset service 216. For example the digital asset service 216 can provide for user accounts 218, wherein a given user account can have one or more designs associated therewith, which can be enabled for the given user's jacket. Thus, a user operating the app 202, can thereby access the digital asset service to obtain designs which are stored to their user account, and which can then be downloaded and rendered to the jacket 100. In some implementations, specific designs are downloaded through the app 202 and wirelessly transferred to the electronics module 104 to be stored and rendered for display. It will be appreciated that the app 202 can facilitate pairing of the jacket 100 to the cell phone 200 and registration of the jacket 100 in association with a user's account.

It will be appreciated that attachment items can also be registered to a user's account. In some implementations, an attachment can be paired to another article, such as a hood being paired to a specific jacket, and such pairing may be managed through the app 202.

In some implementations, the digital asset service 216 provides access to a digital marketplace 220 through which designs can be purchased or otherwise obtained. In some implementations, purchase of a design can utilize various types of currency, including fiat currencies as well as virtual currencies such as points or rewards, cryptocurrencies, etc. in some implementations, users can contribute designs to the digital marketplace 220 and receive at least a portion of revenues generated through sales of such designs.

In some implementations, the digital asset service 216 is linked to, or a part of, a gaming service 226. The gaming service 226 is configured to track information about users' gaming activity. For example, in some implementations users can earn points or rewards through their gameplay, and such points or rewards can be redeemed in the digital marketplace 220 for designs that can be rendered on their garment such as jacket 100. In some implementations, user gameplay can be configured to directly earn specific designs, such as a user earning a design by passing a certain level of a video game. It will be appreciated that such designs, whether purchased or directly earned or otherwise obtained, will be associated with a user's user account, and thereby enabled for use with a given garment capable of display of the design as presently described.

In some implementations, the digital asset service 216 implements digital rights management logic 222 to control aspects of the designs relating to digital rights management. For example, a given design may be configured to have a limited lifespan of usability, and the DRM logic 222 can accordingly manage the expiration of such a design. For example, in some implementations, a digital signature authorizing a specific pattern may be valid for a specific amount of time, and then if not re-upped or extended, then the pattern would no longer continue to be drawn.

In some implementations, the amount of time that a given design is displayed by the jacket 100 is tracked for purposes of DRM attribution. For example, the user may switch between various designs and therefore it is useful to determine how much time a given design is actually displayed. In some implementations, a total time limit for display of a design may be implemented, and the amount/duration of time the design is displayed is tracked to determine when the time limit is reached.

In some implementations, the digital asset service 216 further implements an event service 224 that is configured to handle event-based designs such as that described in further detail below. For example, designs can be promulgated to enable garments worn by users at a given event. That is, users may enable their garments to receive designs or images from specified parties, and these received designs/images can be automatically triggered at a given event to render to the users' garments.

Though the jacket 100 has been described as being managed through an app on a cellular phone, in other implementations such an app (or an application) can be implemented on other devices such as a tablet, laptop computer, PC, game console, or any other device capable of communications with the jacket. In some implementations, the jacket can be managed through a web interface accessed through a web browser. In some implementations, the jacket 100 is connected using a wired connection instead of a wireless connection. In some implementations, the electronics module is removable and configured to be connected to another device to enable pre-configuration of the electronics module, for example, to load pre-defined images/designs for rendering, to set-up triggering events and responses, etc. Then when the jacket 100 is worn by the user, the jacket's display (or that of an attachment) is automatically triggered to change rendering based on events such as those described herein.

In some implementations, the jacket 100 is a networked device capable of connecting directly to the network 214. For example, the jacket 100 may connect over the network 214 to the digital asset service 216 and be managed via communication with the digital asset service 216. For example, the user operating the app 202 may interact with the digital asset service 216 through the app 202, and changes to the configuration of the jacket 100 can be communicated to the jacket 100 over the network 214 by the digital asset service 216.

Figure 3:
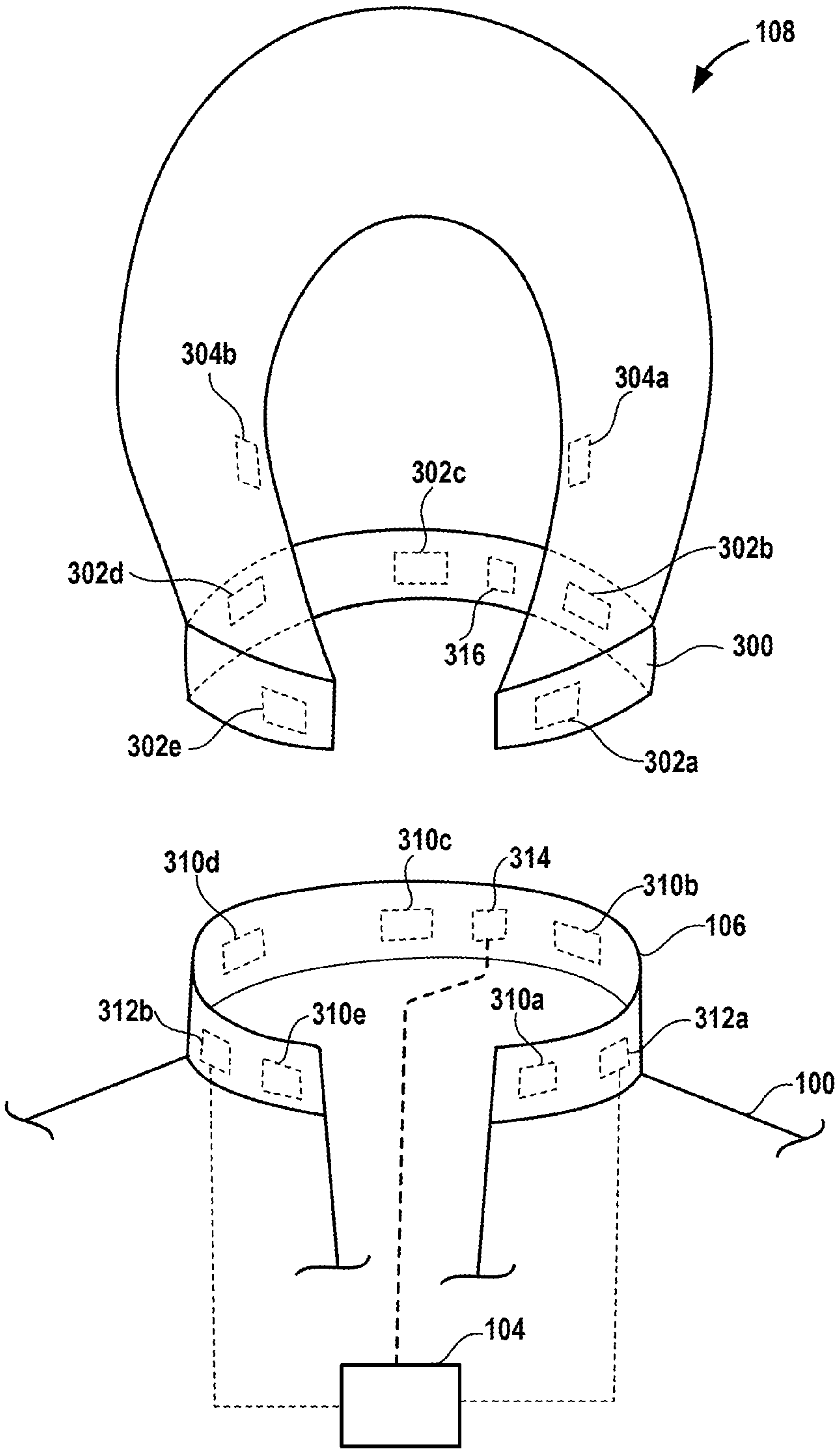
FIG. 3 illustrates a close-up view of a hood attachment for a jacket, in accordance with implementations of the disclosure.

FIG. 3 illustrates a close-up view of a hood attachment for a jacket, in accordance with implementations of the disclosure. As shown in the illustrated implementation, the hood 108 is configured to attach to the jacket 100, as has been described. In some implementations, the attachment of the hood 108 is implemented through a system of magnets on the hood and/or the jacket. In the illustrated implementation, the hood 108 includes a collar portion 300 having a plurality of permanent magnets 302*a*, 302*b*, 302*c*, 302*d*, and 302*e* integrated therein. The magnet configuration as shown is provided by way of example without limitation, as there can be any number of magnets, or an array of magnets, which may be arranged along the collar portion 300 in any configuration that facilitates attachment of the hood 108 to the jacket 100.

Along the collar portion 106 of the jacket 100, there are a plurality of corresponding attachment portions 310*a*, 310*b*, 310*c*, 310*d*, and 310*e*, which are configured to align with the magnets 302*a*, 302*b*, 302*c*, 302*d*, and 302*e*, respectively, when the hood 108 is attached to the jacket 100. The attachment portions can be defined from a ferromagnetic material such that the magnets 302*a-e* are attracted to the ferromagnetic material. In some implementations, the attachment portions 310*a-e* consist of permanent magnets configured so that their polarity is arranged in a manner so that the magnets 302*a-e* are attracted thereto to facilitate attachment of the hood 108.

In some implementations, the collar portion 106 of the jacket 100 further includes sensors 312*a* and 312*b* for detected attachment or detachment of the hood 108. In some implementations, the sensors 312*a* and 312*b* consist of Hall effect sensors which detect the presence or absence of the magnetic fields produced by the magnets 302*a-e*. In this manner, the sensors 312*a* and 312*b* are capable of detecting when the hood is attached or detached by detecting the change in the magnetic fields. In some implementations, the sensors 312*a* and 312*b* are connected to the electronics module 104, which processes (e.g. using a processor/memory of the electronics module 104) the signals from the sensors 312*a* and 312*b*, to determine whether the hood is attached or detached from the jacket 100.

In some implementations, the hood 108 further includes magnets 304*a* and 304*b*, which are disposed along the opening of the hood 108. As shown, the magnets 304*a* and 304*b* are positioned so that their distance from the sensors 312*a* and 312*b* changes in accordance with the hood being worn up (on/covering the user's head) or down (collapsed on the user's back). Hence, in some implementations, the sensors are also capable of detecting, based on the changes in magnetic fields produced in accordance with the positioning of the magnets 304*a* and 304*b*, whether the hood is in an up or down configuration. In some implementations, the detected configuration of the hood being up or down can be used to trigger changes in content displayed on the jacket 100, or on the hood 108 when equipped with a display mechanism.

In some implementations, the electronics module 104 connects to the hood 108 via connector 314 (on the jacket collar 106) which mates to a connector 316 (on the hood collar 300) when the hood is attached to the jacket. The electronics module 104 can thereby provide control signals and power to the hood 108, to control rendering of images/designs on display portions of the hood 108, such as by rendering on an e-ink display or controlling color of color changing textiles that are integrated in the hood 108. In other implementations, the hood is integrated with the jacket, and may be non-detachable from the jacket, so that connections to integrated displays of the hood need not be made via such connectors 314 and 316 as previously described.

Figure 4:
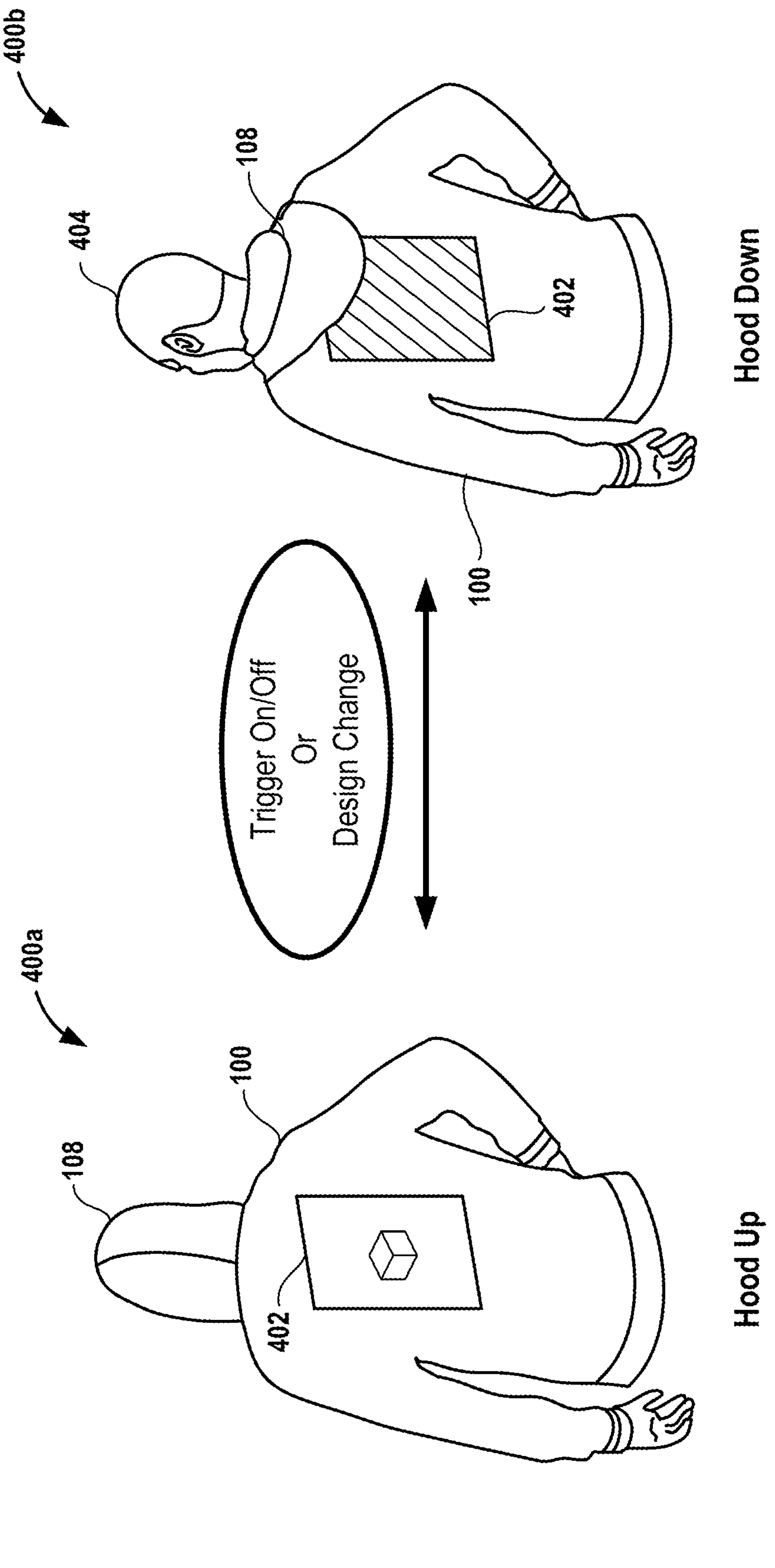
FIG. 4 illustrates a user wearing a hood in up and down configurations that trigger changes in display on a jacket, in accordance with implementations of the disclosure.

FIG. 4 illustrates a user wearing a hood in up and down configurations that trigger changes in display on a jacket, in accordance with implementations of the disclosure. In the illustrated implementation, at reference 400*a*, a user 404 wearing a jacket 100 with a hood 108 is shown. The hood is shown being worn in an up configuration, so as to cover the head of the user 404. Whereas at reference 400*b*, the hood 108 is shown being worn in a down configuration, such that it lays along the back of the user 404.

In some implementations, the up/down configuration of the hood 108 is detected as described above, and utilized to trigger display changes on the jacket 100. For example, in the illustrated implementation, the hood's up/down configuration can trigger changes in rendering on a display 402 on the back of the jacket 100. Such changes in rendering can include triggering rendering on or off in some implementations, or changing the design or image being rendered in some implementations, etc. In some implementations, wearing the hood in an up configuration triggers rendering to turn on and/or render a first image, whereas wearing the hood in a down configuration triggers rendering to turn off and/or change to a second image.

It will be appreciated that the jacket 100 can be configured to provide enhancements to the user experience in various group contexts. The jacket 100 can be configured to display specific imagery associated with a given event.

Figure 5:
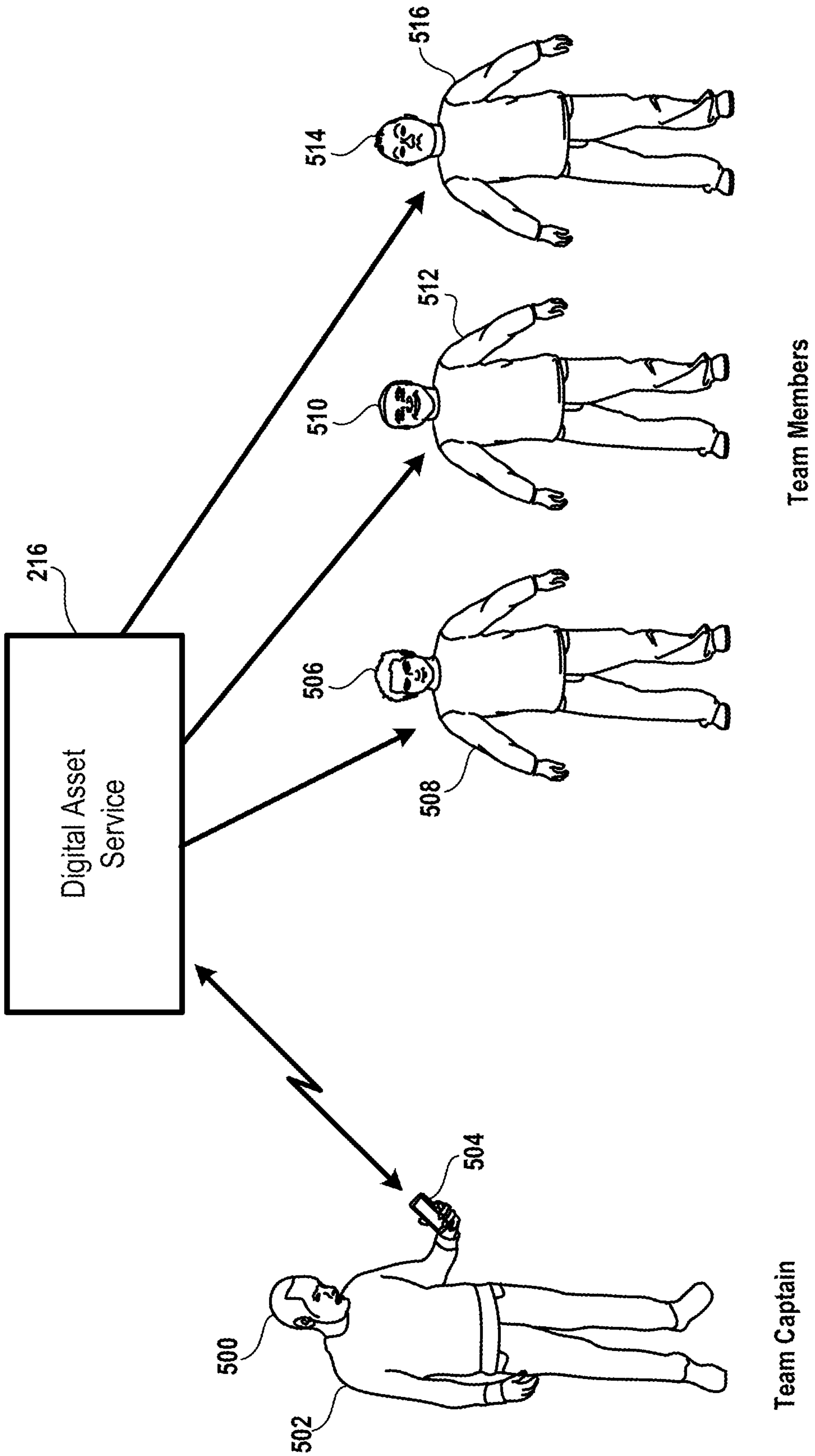
FIG. 5 conceptually illustrates a lead user configuring jackets of team members at a group event, in accordance with implementations of the disclosure.

FIG. 5 conceptually illustrates a lead user configuring jackets of team members at a group event, in accordance with implementations of the disclosure. For example, at an e-sports tournament or other group event, users 506, 510, and 514 may opt in to join a team, for example, via respective phone apps communicating with digital asset service 216. A team leader 500 may set configuration details for jackets worn by team members, for example, through the app on the team leader's phone 504 accessing the digital asset service 216. The digital asset service 216 propagates the jacket configuration to the team members. That is, by joining the team, the team members are enabled to download, through their respective phone apps, coordinated designs to their jackets for display. Such designs may be designated by the team leader 500 in some implementations.

In some implementations, the app and/or jackets are configured so that team members' jackets automatically display the designated design for the team. For example, in some implementations, the jackets 508, 512, and 516, which are worn by team members 506, 510, and 514, respectively, can thereby automatically be configured to display the same image as the jacket 502 worn by the team leader 500. In some implementations, the jackets of a team can be configured to display one image when hoods are attached, and then when it is game time, the hoods are removed, triggering a different image to be displayed.

In some implementations, the team leader 500 may be a famous player/gamer, and the team members are fans of the team leader 500. In this scenario, the team members are thereby able to express their support and share in the experience of wearing a design associated with the team leader 500, which the team leader 500 might also be wearing or which may be complementary or otherwise related to the team leader's design.

In some implementations, the team members 506, 510, and 514 may automatically receive updates to their jackets

508, 512 and 516. It will be appreciated that designs can be dynamically updated over time, providing variety for the team members and others that may view the jackets.

Figure 6:
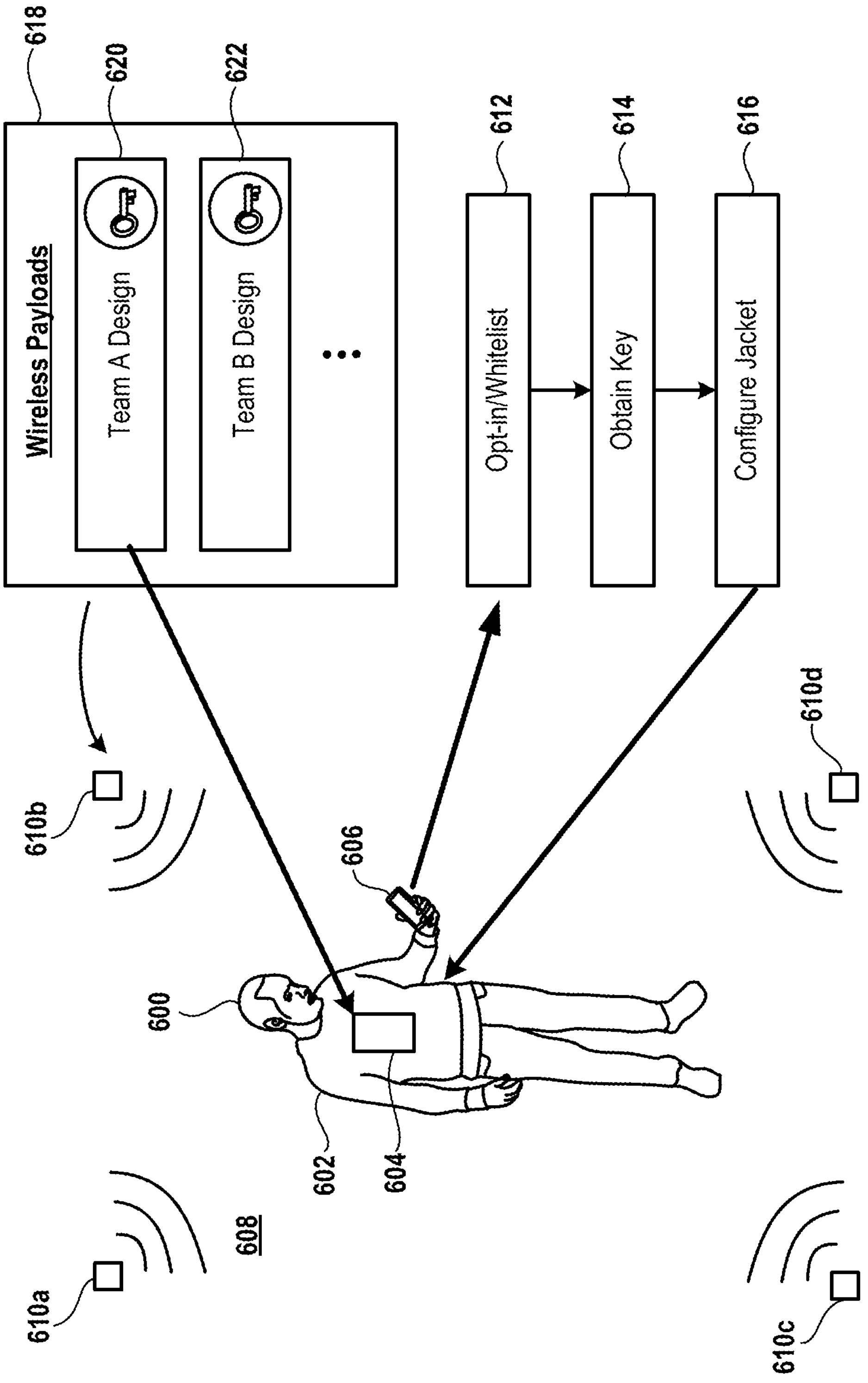
FIG. 6 conceptually illustrates a user wearing a garment that receives wireless updates in a venue, in accordance with implementations of the disclosure.

FIG. 6 conceptually illustrates a user wearing a garment that receives wireless updates in a venue, in accordance with implementations of the disclosure. In the illustrated implementation, a user 600 is located in a venue/arena 608, which in some implementations, is a venue for an e-sports event, but can be any other type of venue. The user 600 wears a garment 602 having a display 604 capable of displaying imagery as has been described. In some implementations, the venue 608 is configured to provide updates to the garment 602 through wireless transmission of data from various wireless transmitters 610*a*, 610*b*, 610*c*, and 610*d* as conceptually shown. The wireless transmitters are configured to transmit wireless payloads 618, which are received by the garment 602 and applied to change the rendering on the display 604 of the garment 602.

As users do not wish to expose themselves to unwanted changes to their garments, so it is important to permit secure access to a user's garment by only those parties that are authorized by the user. To this end, in some implementations, at operation 612 the user 600 may opt-in or whitelist a given source for updates, e.g., via an app on their cellular phone 606, thereby indicating that the given source is a trusted source with permission to update the display on the user's garment. At operation 614, a public key for the whitelisted source is obtained, and at operation 616, the garment can be configured with the public key for the whitelisted source.

The wireless transmitters 610*a-d* broadcast wireless payloads 618 in the venue 608. These payloads can be signed with respective private keys for security. Upon receipt of the wireless payloads 618, the garment 602 (or specifically, an electronics module included in the garment, not shown) parses through the wireless payloads to identify which payload is from a whitelisted source, and further validates that the identified payload has been signed with a private key that can be validated using the public key of the whitelisted source. This verifies the sender/source of the payload by verifying the signature. And accordingly, the update, such as a design to be rendered on the display 604 of the user's garment, is applied, thereby automatically changing the appearance of the garment 602.

By way of example without limitation, in the context of an e-sports event, the wireless payloads 618 can include designs associated to a given team or player, such as a Team A Design 620, a Team B Design 622, etc. In the illustrated implementation, the user 600 has whitelisted Team A, and accordingly, the Team A Design 620 is applied to the user's garment 602, rendering an image associated with Team A on the display 604 of the garment 602.

It will be appreciated that the wireless payloads 618 can dynamically change as set by the provider. Teams at an e-sports tournament can configure their payloads to show imagery or information of their choosing, and these can change over time during the course of the tournament. In some implementations, the display of information such as stats or scores of a given team can be shown. In some implementations, scoreboards or leaderboards can be displayed. These and other types of information can be continually updated during the e-sports event, and users may opt-in to receive such updates and have them automatically drawn on their garments. Utilizing a system as described above, though wireless transmitters are sending out various payloads having various possible updates, a user's garment will accept and render only those updates that have been whitelisted, so that the user controls which updates will be accepted for rendering on their garment.

In some implementations, wireless transmitters broadcast data using a wireless technology such as Bluetooth Low Energy, WiFi, ultra-wideband, etc. It will be appreciated that any wireless transmission protocol or technology can be employed that is capable of transmitting data to update a garment as presently described. In some implementations, the garment is configured to connect to a network to obtain the requisite data for updating the garment. In some implementations, the wireless payloads are managed and/or transmitted from a server, which may be local to or remote from the venue 608.

In some implementations, the wireless payloads provided in different regions of the venue 608 can be different, so that the user's garment is updated with different designs as the user moves to the different regions of the venue. Accordingly, different wireless transmitters in the different regions can be configured to broadcast the different designs.

In a related implementation, the geo-location of the user within the venue can be determined and used to trigger different rendering on the garment 602. For example, the geo-location may be determined based on the wireless signals received by the garment 602, such as based on the relative strengths of the signals or timing of the signals. In some implementations, the geo-location can be determined using GPS information, based on hardware incorporated into the garment or based on another device such as the user's cellular phone. In some implementations, the garment can be configured to render different designs or information based on its determined geo-location.

Figure 7:
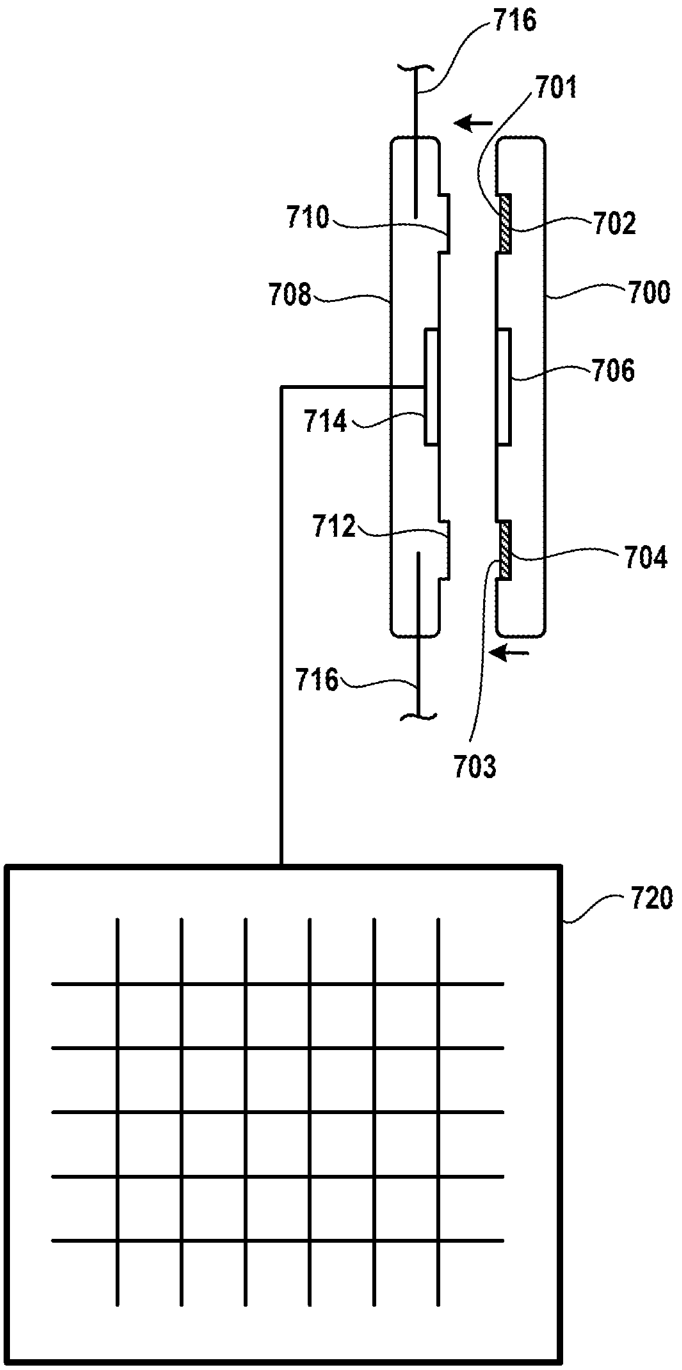
FIG. 7 conceptually illustrates an electronics module for controlling an integrated display of a garment, in accordance with implementations of the disclosure.

FIG. 7 conceptually illustrates an electronics module for controlling an integrated display of a garment, in accordance with implementations of the disclosure. As noted above, an electronics module is provided which can include hardware and software for powering and controlling a garment display. In some implementations, the electronics module is removable for charging and to protect the electronics module when the garment is laundered. In the illustrated implementation, an electronics module 700 is conceptually shown in cross-section, which is configured to be detachable from the garment.

As conceptually shown, the electronics module 700 is configured to attach to a receptacle 708 that is integrated into the garment. In some implementations, alignment of the electronics module 700 to the receptacle 708 is aided by protrusions 710 and 712 of the receptacle that mate with corresponding grooves 701 and 703 of the electronics module 700. In some implementations, the electronics module includes magnets 702 and 704 that facilitate attachment of the electronics module 700 to the receptacle 708. The protrusions 710 and 712 can be formed from a ferromagnetic material to which the magnets 702 and 704 are attracted.

When the electronics module 700 attaches to the receptacle 708, a connection is made between corresponding connectors 706 and 714 of the electronics module and the receptacle, respectively. In some implementations, the connectors 706 and 714 are configured to make contact between conductive surfaces/contacts. In other implementations, the connectors 706 and 714 make an inductive connection, so that power and/or data are transferred without specific contact being made between conductive contacts. This also enables the electronics module 700 and the receptacle 708 to be sealed and protected from dirt or other contaminants, even when not connected to each other. When connection is made, then the electronics module is capable of controlling rendering on a display 720 integrated in the garment.

In some implementations, the receptacle 708 is integrated or connected to the fabric 716 of the garment. In some implementations, the receptacle 708 is hidden from view by virtue of its placement within the garment, such as within a pocket or other covered portion of the garment.

In some implementations, the display 720 is configured as a patch which can be attached to any of various items having sufficient surfaces for attachment, such as articles of clothing, a bag, a backpack, a game console, a monitor (e.g., back of monitor), a desk, a chair, furniture, a wall or other surfaces. By way of example without limitation, such a patch can be attached or adhered to a given surface using adhesives, velcro, clips, pins, etc. In this concept, the patch is highly customizable in terms of placement by the user. In some implementations, the patch can be configured to receive and render different designs based on actions occurring in a video game.

Figures 8A, 8B, 8C:
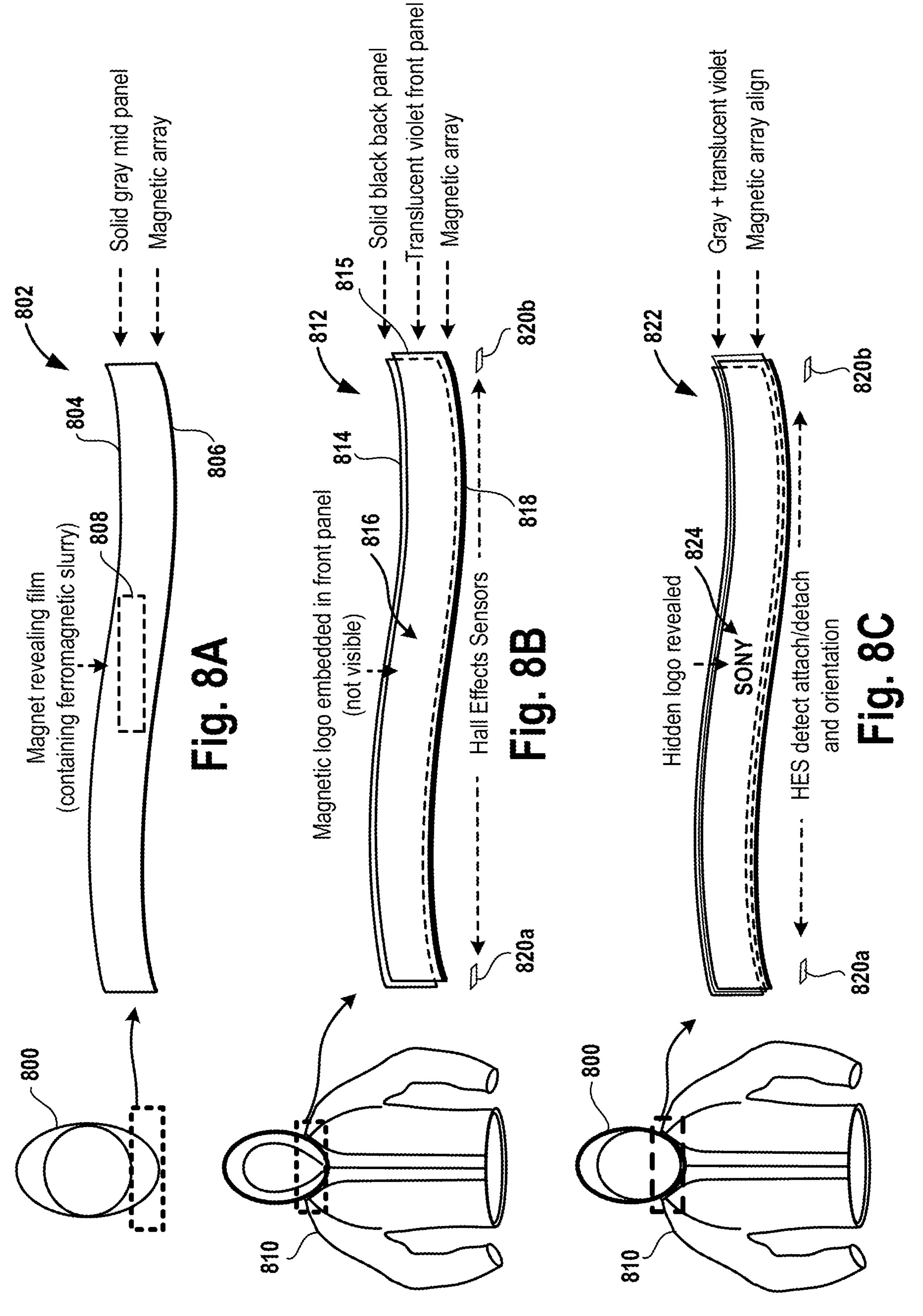
FIGS. 8A, 8B, and 8C conceptually illustrate collar portions of a hood and jacket combination, in accordance with implementations of the disclosure.

FIGS. 8A, 8B, and 8C conceptually illustrate collar portions of a hood and jacket combination, in accordance with implementations of the disclosure. FIG. 8A illustrates a hood 800, and a representative portion is conceptually shown at reference 802. In some implementations, the hood collar consists of a solid neutral color mid panel 804, such as a solid gray color in some implementations. The hood collar further includes a magnetic array 806, to enable attachment to the jacket collar described below. In some implementations, a magnet revealing film 808 is disposed along the panel 804. The magnet revealing film 808 can contain a ferromagnetic slurry or other material capable of changing appearance in response to applied magnetic fields.

FIG. 8B illustrates a jacket 810, and a representative portion of the jacket collar is shown at reference 812. In some implementations, the jacket collar consists of a solid dark color back panel 814 (such as a solid black color) and a translucent front panel 815 (such as a translucent violet color in some implementations). In some implementations, a magnetic logo/design 816 is embedded in the front panel, which is not visible when the hood 800 is detached from the jacket 810. Furthermore, in some implementations, hall effect sensors 820*a* and 820*b* are provided along or proximate to the jacket collar, in order to sense magnetic fields associated with attachment/detachment of the hood and jacket.

FIG. 8C illustrates the hood 800 attached to the jacket 810, and the attachment of the representative portions described above is conceptually shown at reference 822. When the hood is attached to the jacket, the mid panel 804 of the hood collar slots between the front panel 815 and the back panel 814 of the jacket collar. The magnetic array 806 of the hood collar and the magnetic array 818 of the jacket collar are aligned, and thereby secure the hood to the jacket. The neutral color of the mid panel and the translucent color of the front panel combine to provide an interesting color change effect that accompanies the attachment of the hood to the jacket, by effectively revealing the coloration of the translucent front panel 815 which was previously hidden by the back panel's dark color. Further, the hidden logo is revealed, as indicated at reference 824, through the magnetic logo 816 acting upon the magnet revealing film 808.

Additionally, the hall effect sensors 820*a* and 820*b* detect the attachment or detachment of the hood and jacket. In some implementations, the attachment or detachment of the hood can trigger changes in designs rendered on the jacket or hood. Further in some implementations, the hall effect sensors 820*a* and 820*b* can be configured to detect changes in the orientation of the hood, such as whether it is being worn up or down, and such orientation can also be utilized to trigger changes in designs rendered on the jacket or hood.

While implementations of the present disclosure have been described in the context of video games, it will be appreciated that the principles of the present disclosure may be applied to other types of simulations or interactive applications. In some embodiments, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

As noted, implementations of the disclosure can be applied to cloud gaming systems. One example of a cloud gaming system is the Playstation® Now cloud gaming system. In such a system, the client device can be a game console, such as a Playstation® 4 or Playstation® 5 game console, or may be another device such as a personal computer, laptop, tablet, cell phone, mobile device, etc.

Figure 9:
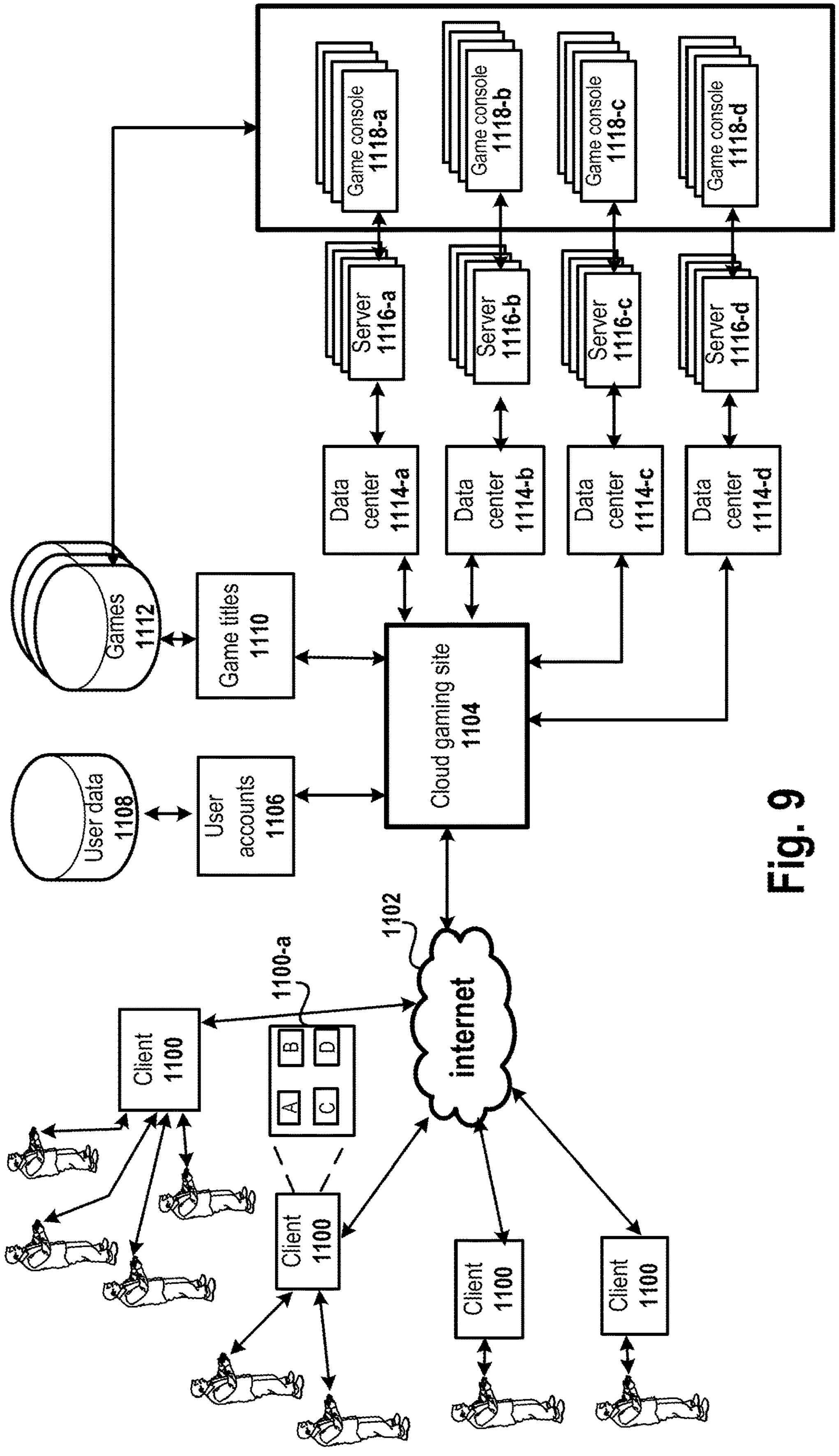
FIG. 9 illustrates an exemplary system used to load game files for a game available through a cloud gaming site, in accordance with implementations of the disclosure.

FIG. 9 illustrates an exemplary system used to load game files for a game available through a cloud gaming site, in accordance with implementations of the disclosure.

The system includes a plurality of client devices 1100 that are communicatively connected to the cloud gaming site 1104 over a network 1102, which can include a LAN, wired, wireless, cellular (e.g. 4G, 5G, etc.), or any other type of data network, including the Internet. When a request to access the cloud gaming site 1104 is received from a client device 1100, the cloud gaming site 1104 accesses user account information 1106 stored in a user data store 1108 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 1110 to identify the game titles that are available at the game cloud site for the user account initiating the request. The game titles data store 1110, in turn, interacts with a games database 1112 to obtain the game titles for all the games that are available for the cloud gaming site. As new games are introduced, the games database 1112 will be updated with the game code and the game titles data store 1110 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 1100-*a*, as shown in FIG. 9.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 10:
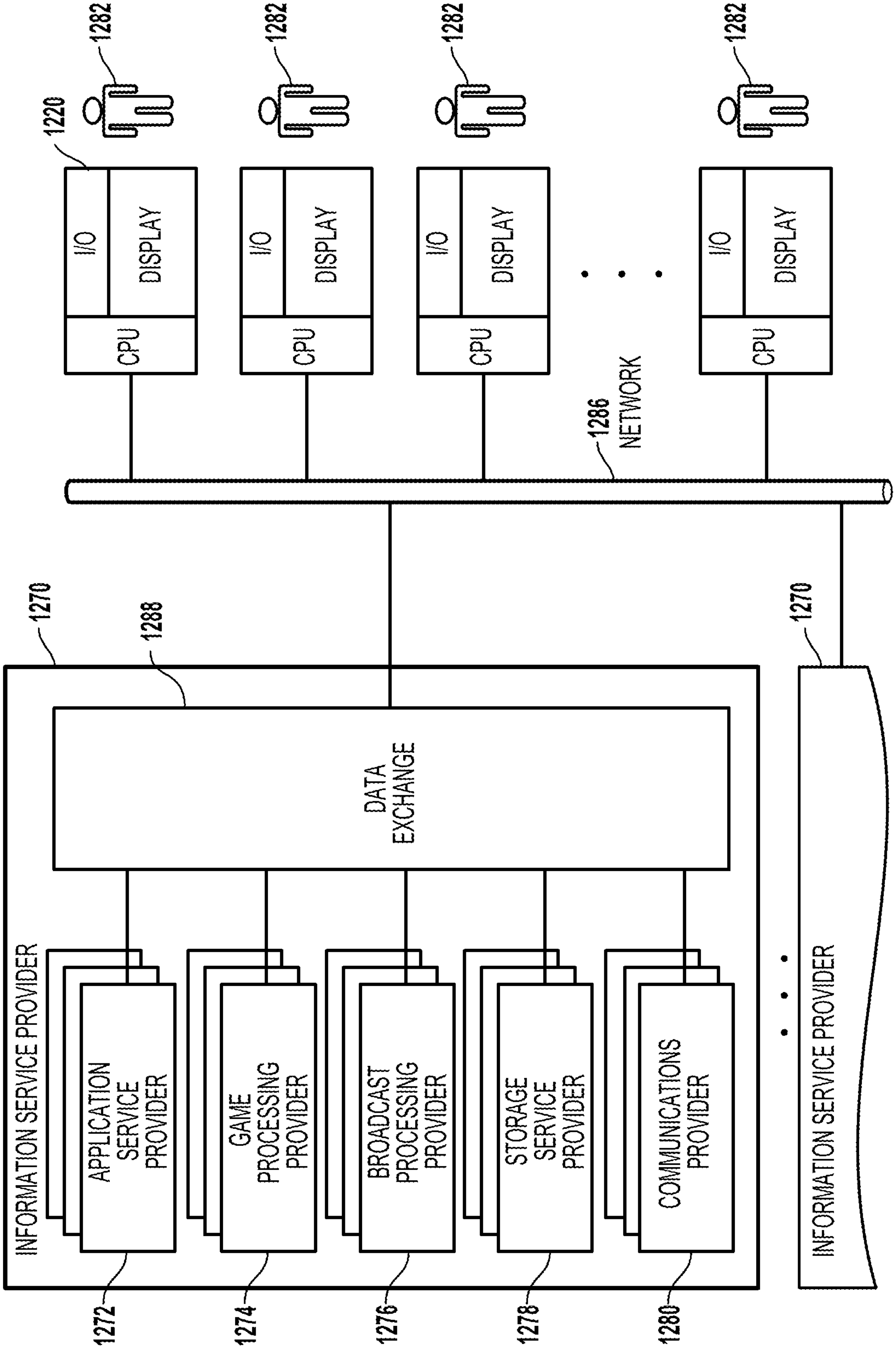
FIG. 10 illustrates an embodiment of an Information Service Provider architecture, in accordance with implementations of the disclosure.

FIG. 10 illustrates an embodiment of an Information Service Provider architecture, in accordance with implementations of the disclosure.

Information Service Providers (ISP) 1270 delivers a multitude of information services to users 1282 geographically dispersed and connected via network 1286. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1270 includes Application Service Provider (ASP) 1272, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1270 includes a Game Processing Server (GPS) 1274 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1276 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1278 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1280 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1288 interconnects the several modules inside ISP 1270 and connects these modules to users 1282 via network 1286. Data Exchange 1288 can cover a small area where all the modules of ISP 1270 are in close proximity, or can cover a large geographic area when the different modules are geographically dispersed. For example, Data Exchange 1288 can include a fast Gigabit Ethernet (or faster) within a cabinet of a data center, or an intercontinental virtual area network (VLAN).

Users 1282 access the remote services with client device 1284, which includes at least a CPU, a memory, a display and I/O. The client device can be a PC, a mobile phone, a netbook, tablet, gaming system, a PDA, etc. In one embodiment, ISP 1270 recognizes the type of device used by the client and adjusts the communication method employed. In other cases, client devices use a standard communications method, such as html, to access ISP 1270.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A garment comprising:

a main garment component configured to be worn by a user, wherein the main garment component comprises:

a flexible display portion;

a controller controlling imagery presented on the flexible display portion; and a sensor;

a detachable garment component comprising:

an attachment component configured to be physically attached to, and detached from, the main garment component; and a sensing component wherein the controller is configured to execute instructions to:

download and store a first design associated with a detached status of the detachable garment component, a second design associated with an attached status of the detachable garment component, and a third design associated with a relative position of the sensor to the sensing component;

when the sensor detects the detachable garment component is attached to the main garment component, displays the second design;

when the sensor detects the detachable garment component is detached from the main garment component, displays the first design; and when the sensor detects the sensing component changes position relative to the sensor while the detachable garment component is attached to the main garment component, display the third design; and a wireless transceiver integrated with the main component, the wireless transceiver is configured to enable wireless communications between the main component and a user device to enable the downloading of the first design and the second design such that the controller can define the imagery presented in response to said attachment or detachment of the detachable garment component.

2. The garment of claim 1, wherein the detachable garment component or the main garment component includes one or more magnets that enable the detachable garment component to be physically attached to, and detached from, the main garment component.

3. The garment of claim 2, wherein the sensor is a Hall effect sensor.

4. The garment of claim 1, wherein the main garment component is a jacket.

5. The garment of claim 4, wherein the detachable garment component is a hood, a collar, pocket, zipper pull, or a cuff.

6. The garment of claim 1, wherein the flexible display portion includes an LED, OLED, ore-ink display.

7. The garment of claim 1, wherein the flexible display portion includes a color-changing textile.

8. The garment of claim 1, wherein the downloading of the first design and the second design is facilitated through an app executed by the user device, said app accessing a digital asset service over a network to obtain the first design and the second design, and said app enabling customization of the association of imagery with the detached status and the attached status, including selection of which of the first design and the second design to associate with the attached status and the detached status.

9. The garment of claim 1, wherein the presentation of the first or second design is configured to occupy a substantial entirety of the flexible display portion.

10. The garment of claim 1, wherein the sensing component includes as magnet and the relative position of the magnet to the sensor is based at least in part on a magnetic field of the magnet.

11. A garment comprising:

a clothing component configured to be worn by a user;

a flexible display integrated with the clothing component;

a wireless transceiver integrated with the clothing component; and a controller, integrated with the clothing component, that is configured to execute instructions to:

receive wireless payloads from the one or more transmitters, wherein the wireless payloads include a plurality of designs for rendering on clothing components;

parse through said wireless payloads to identify one or more trusted payloads from a trusted source designated by a user opt-in setting to the exclusion of payloads from other sources that are not designated by the user opt-in setting;

determine a relative position between a first location of the clothing component and a second location of the transmitter; and display, on the flexible display, imagery of the one or more trusted payloads based at least in part on the relative position.

12. The garment of claim 11, wherein the clothing component is a jacket.

13. The garment of claim 11, wherein the flexible display includes an LED, OLED, ore-ink display.

14. The garment of claim 11, wherein the flexible display includes a color-changing textile.

15. The garment of claim 11, wherein the one or more transmitters are in a venue configured to host an e-sports event.

* * * * *